United States Patent
Duckworth et al.

(10) Patent No.: US 10,421,097 B2
(45) Date of Patent: Sep. 24, 2019

(54) REMOTE ADHESIVE MONITORING SYSTEM

(71) Applicants: HENKEL IP & HOLDING GMBH, Duesseldorf (DE); HENKEL AG & CO. KGAA, Duesseldorf (DE)

(72) Inventors: David Duckworth, Blackburn (GB); Sean Sklios, New Brunswick, NJ (US); Jordan Yagoda, North Brunswick, NJ (US); Jerone Chambers, Huntingdon Valley, PA (US); John Rye, Mason, OH (US)

(73) Assignees: HENKEL AG & CO. KGAA, Duesseldorf (DE); HENKEL IP & HOLDING GMBH, Duesseldorf (DE)

( * ) Notice: Subject to any disclaimer, the term of this patent is extended or adjusted under 35 U.S.C. 154(b) by 0 days.

(21) Appl. No.: 15/911,365

(22) Filed: Mar. 5, 2018

(65) Prior Publication Data

US 2018/0185872 A1 Jul. 5, 2018

Related U.S. Application Data

(63) Continuation of application No. PCT/US2016/050869, filed on Sep. 9, 2016.
(Continued)

(51) Int. Cl.
*B05C 11/10* (2006.01)
*G05B 13/02* (2006.01)
(Continued)

(52) U.S. Cl.
CPC ...... *B05C 11/1005* (2013.01); *B05C 11/1023* (2013.01); *F04B 5/02* (2013.01);
(Continued)

(58) Field of Classification Search
CPC .... B05C 11/1005; B05C 11/1023; F04B 5/02; F04B 9/00; F04B 13/00; F04B 15/02;
(Continued)

(56) References Cited

U.S. PATENT DOCUMENTS

| | | | | |
|---|---|---|---|---|
| RE32,074 E | * | 1/1986 | Bennett | B65B 43/52 141/169 |
| 5,255,819 A | * | 10/1993 | Peckels | B67D 3/0041 222/1 |

(Continued)

FOREIGN PATENT DOCUMENTS

| CA | 2117510 C | 7/2002 |
|---|---|---|
| EP | 1308216 A2 | 5/2003 |

(Continued)

*Primary Examiner* — Thomas C Lee
*Assistant Examiner* — Michael Tang
(74) *Attorney, Agent, or Firm* — Sun Hee Lehmann

(57) ABSTRACT

A remote adhesive monitoring system is used in connection with adhesive applied to workpieces moving along a production line. A reservoir, pump, and applicator apply the adhesive to the workpieces. A monitor control computer has an associated data processing program. A pump cycle sensor senses pump cycles. An applicator sensor senses when the adhesive is applied to the workpieces. A workpiece sensor senses the workpieces moving along the line. The monitor control uses input from the applicator sensing means and the workpiece sensor to determine an ON time per each workpiece at a predetermined speed. The monitor control uses input from the workpiece sensor and the pump cycle sensor to determine the number of workpieces per pump cycle. The monitor control calculates an ON time to TOTAL time ratio per each workpiece. The monitor control will then calculate an amount of adhesive used for the given ON time to TOTAL time ratio.

4 Claims, 5 Drawing Sheets

Related U.S. Application Data

(60) Provisional application No. 62/217,255, filed on Sep. 11, 2015.

(51) Int. Cl.

| | | |
|---|---|---|
| *F04B 5/02* | (2006.01) | |
| *F04B 9/00* | (2006.01) | |
| *F04B 13/00* | (2006.01) | |
| *F04B 15/02* | (2006.01) | |
| *F04B 23/02* | (2006.01) | |
| *F04B 49/00* | (2006.01) | |
| *F04B 49/06* | (2006.01) | |
| *F04B 51/00* | (2006.01) | |
| *G05B 15/02* | (2006.01) | |
| *F04B 19/22* | (2006.01) | |

(52) U.S. Cl.
CPC ............... *F04B 9/00* (2013.01); *F04B 13/00* (2013.01); *F04B 15/02* (2013.01); *F04B 23/02* (2013.01); *F04B 49/00* (2013.01); *F04B 49/065* (2013.01); *F04B 51/00* (2013.01); *G05B 13/02* (2013.01); *G05B 15/02* (2013.01); *F04B 19/22* (2013.01); *F04B 2201/0209* (2013.01); *F04B 2201/06012* (2013.01); *G05B 2219/45238* (2013.01); *G05B 2219/49056* (2013.01)

(58) Field of Classification Search
CPC ........ F04B 23/02; F04B 49/00; F04B 49/065; F04B 51/00; F04B 19/22; F04B 2201/0209; F04B 2201/06012; G05B 13/02; G05B 15/02; G05B 2219/45238; G05B 2219/49056

See application file for complete search history.

(56) References Cited

U.S. PATENT DOCUMENTS

| | | |
|---|---|---|
| 5,857,589 A | 1/1999 | Cline et al. |
| 5,992,686 A * | 11/1999 | Cline .................. B05B 12/1418 222/1 |
| 7,462,377 B2 | 12/2008 | Gaon et al. |
| 7,610,113 B2 | 10/2009 | Cocciadiferro et al. |
| 2007/0130965 A1* | 6/2007 | Boarman .............. F25D 23/126 62/135 |
| 2007/0179643 A1 | 8/2007 | Boger et al. |
| 2013/0206793 A1* | 8/2013 | Minica ................ B67D 1/0085 222/129.1 |
| 2015/0046065 A1* | 2/2015 | Guido ................ F02D 41/0027 701/104 |
| 2016/0008834 A1* | 1/2016 | Brudevold ............. F04B 49/06 427/8 |

FOREIGN PATENT DOCUMENTS

| | | |
|---|---|---|
| EP | 2404679 A1 | 1/2012 |
| SU | 1837824 A3 | 8/1993 |
| WO | 2005045536 A2 | 5/2005 |

\* cited by examiner

REMOTE ADHESIVE MONITORING SYSTEM

FIELD OF THE INVENTION

The present invention is directed to an apparatus and method that monitors the amount of a viscous fluid delivered to a workpiece on a product assembly line, and in particular, a system for monitoring the amount of adhesive delivered to a workpiece by monitoring the strokes of a pump delivering the adhesive.

BACKGROUND OF THE INVENTION

In product assembly lines having cardboard boxes filled with a product, the boxes, or cases, or workpieces, are closed and glued using an automated system. The cases may be filled with a granular product such as cereal, for example. The cases move along a filling line and adhesive is applied to the case flaps. The flaps are closed, and the adhesive sets quickly. A typical apparatus and method currently used to apply the adhesive to the cases is shown in FIGS. 1-3. The adhesive is typically a hot-melt type of glue.

FIG. 1 depicts an exemplary production dispensing system at 10. The adhesive is stored in a reservoir 12, and then fed into a pump 14. The pump 14 delivers the adhesive to an applicator nozzle and valve 38. The applicator 38 includes an electrically controlled actuator 36, which facilitates dispensing timing and duration. The actuator 36 is in turn controlled by a dispenser control computer 42. Production sensors 44 on the filling line (upstream or downstream) detect workpieces 40 moving through in a process direction 46, and the signals are sent to the control 42. In FIG. 1, dotted lines represent electrical control signals. Solid lines, represent fluid conduits and connections. The reservoir 12, pump 14, nozzle 38, and associated piping are maintained at a predetermined temperature to prevent the hot-melt glue from solidifying in the system. The production system shown in FIG. 1 could make use of the remote adhesive monitoring system.

The pump 14 is typically a double-acting piston type. Each end of the cylinder, first chamber 18A and second chamber 18B, has two check valves. First chamber 18A has one first inlet check valve 24 from the reservoir 12, and one first outlet check valve 26 connected to the nozzle 38. Second chamber 18B has one second inlet check valve 28 from the reservoir 12, and one second outlet check valve 30 connected to the nozzle 38. From the pump 14, the adhesive flows to nozzle 38, and is then extruded onto the workpieces 40. Typically, the adhesive is extruded in a series of beads of a predetermined length and cross-section, resulting in a uniform weight of each bead for a given production run.

FIG. 2 shows the pump 14 with the piston 16 moving to the left as in arrow 20. First chamber 18A has positive gauge pressure (above atmospheric). The pressure will close first inlet check valve 24. First outlet check valve 26 will open, and adhesive will flow to the nozzle 38. Second chamber 18B has negative gauge pressure (below atmospheric). The pressure will close second outlet check valve 30. Second inlet check valve 28 will open, and adhesive will flow from the reservoir 12 into the second chamber 18B. Due to manufacturing tolerances, there is a significant gap between the piston 16 and the cylinder bore 18C. The pressure difference will cause adhesive to flow, or leak, around the piston 16 from first chamber 18A to second chamber 18B. The leakage is shown at 34.

FIG. 3 shows the pump 14 with the piston 16 moving to the right as in arrow 22. Second chamber 18B has positive gauge pressure. The pressure will close second inlet check valve 28. Second outlet check valve 30 will open, and adhesive will flow to the nozzle 38. First chamber 18A has negative gauge pressure. The pressure will close first outlet check valve 26. First inlet check valve 24 will open, and adhesive will flow from the reservoir 12 into the first chamber 18A. Due to the gap between the piston 16 and the cylinder bore 18C, the pressure difference will cause adhesive to flow, or leak, around the piston 16 from second chamber 18B to first chamber 18A. The leakage is shown at 32.

A movement of the piston 16 in one direction from bottom dead center at one end of the cylinder to top dead center at the opposite end is called one stroke. A movement of the piston 16 from any starting position to one end of the cylinder, reversing direction and moving to the opposite end and reversing back to the starting position is called one cycle.

The leakage will vary from one pump manufacturer to another. Therefore, the system must be calibrated for each particular manufacturers pump. The leakage past the piston occurs constantly, even when no adhesive is being dispensed. Thus, the amount of adhesive used cannot be determined by simply multiplying the swept cylinder volume per cycle by the number of cycles counted.

The system can be used with a variety of pump types, including piston pumps; gear pumps; sliding vane pumps; and centrifugal pumps. However, the system is intended to be used with a pump having significant leakage.

Utilizing a pump with no leakage would drive up the system cost. The pump disclosed above, which is in common use in industry, is designed with a generous clearance between the piston and the cylinder bore. No piston seals are used. The tolerances in manufacturing are large, which keeps the cost low.

Measuring the adhesive flow with a positive displacement flowmeter has been done, but is prohibitively expensive. Moreover, the flowmeter of this type is susceptible to breakdown, and repair requires the filling line to be down for a significant time. In addition, the installation and repair is invasive, in that it requires disassembly of vendor's equipment and installing a third party add-on apparatus.

Accordingly, there is a need for a system capable of monitoring the amount of adhesive delivered to a workpiece by monitoring the strokes of a pump delivering the adhesive.

SUMMARY OF THE INVENTION

In one aspect, a remote adhesive monitoring system is used in connection with workpieces moving at a predetermined speed in a process direction on a production line. An adhesive is applied to the workpieces on the line. The production dispensing system comprises a reservoir for containing the adhesive. A pump, operatively communicating with the reservoir, is for pumping the adhesive. An applicator applies the adhesive to the workpieces. The applicator has an applicator valve operatively communicating with the pump.

A monitor control is provided with an associated data processing program. A pump cycle sensor is mounted adjacent the pump and operatively electrically connected to the monitor control. The pump cycle sensor is adapted to sense pump cycles.

An applicator sensing means is provided for sensing when the adhesive is applied to the workpieces. The applicator sensing means is operatively electrically connected to the monitor control.

A workpiece sensor is mounted adjacent the workpieces and operatively electrically connected to the monitor control. The workpiece sensor is adapted to sense the workpieces moving along the line.

In operation, the monitor control will use input from the applicator sensing means and the workpiece sensor to determine an ON time per each workpiece at the predetermined speed. The monitor control will use input from the workpiece sensor and the pump cycle sensor to determine the number of workpieces per pump cycle. The monitor control will calculate an ON time to TOTAL time ratio per each workpiece. The monitor control will then calculate an amount of adhesive used for the given ON time to TOTAL time ratio.

In another aspect, a method is disclosed for remotely monitoring an adhesive applied to workpieces moving at a predetermined speed in a process direction on a production line. The line has a reservoir, a pump, and an applicator. The method comprises weighing the adhesive applied to the workpieces. An applicator sensor is provided for sensing the adhesive applied to the workpieces. A workpiece sensor is provided for sensing the workpieces moving. A monitor control and an associated data processing program is provided.

An ON time is calculated for applying the adhesive per each workpiece at the predetermined speed. The monitor control calculates this using input from the applicator sensor and the workpiece sensor.

A pump cycle sensor is provided for sensing pump cycles. Workpieces per pump cycle is calculated with the monitor control using input from the workpiece sensor and the pump cycle sensor. An ON time to TOTAL time ratio is defined as ON ratio. The ON ratio is calculated per each workpiece with the monitor control. An amount of adhesive used for the ON ratio is calculated with the monitor control.

These and other aspects, objectives, features, and advantages of the disclosed technologies will become apparent from the following detailed description of illustrative embodiments thereof, which is to be read in connection with the accompanying drawings.

DETAILED DESCRIPTION OF THE INVENTION

The present invention provides a system which can continuously and non-invasively monitor and measure the amount of adhesive delivered to workpieces on an automated line. As will be described hereinbelow, the system accomplishes this by monitoring the strokes of the pump delivering the adhesive.

The system is installed and used non-invasively without need to contact the adhesive or disrupt the dispensing apparatus. The system is monitored remotely and functions independently of the dispensing apparatus, so that the system can be installed and removed without affecting operation of the dispensing apparatus.

It is to be understood that the remote adhesive monitoring system disclosed herein is not limited to use with boxes or with adhesive. The remote adhesive monitoring system can be used with any viscous fluid applied to any workpiece, within the spirit and scope of the claims. For example, the system can be used with caulking applied to windows and doors on a manufacturing assembly line.

The system of the present invention employs as parameters the on and off time of the valve and the cycle of the piston to calculate the amount of adhesive delivered.

As used herein, "ON" time is defined as the elapsed time period during which the applicator valve is open and the nozzle is dispensing adhesive per workpiece. During the "ON" time, one continuous bead of adhesive may be deposited on the workpiece, or several beads in sequence. The time for all beads on one workpiece added together gives the "ON" time.

As used herein, "OFF" time is defined as the elapsed time period, in between consecutive "ON" periods, during which the applicator valve is closed and the nozzle is dispensing no adhesive, from one workpiece to an adjacent workpiece. An "OFF" time period represents the time between all adjacent beads of adhesive on one workpiece added to the time between two adjacent workpieces.

As used herein, "TOTAL" time is defined as the sum of "ON" periods and "OFF" periods, occurring from one workpiece to an adjacent workpiece. The "TOTAL" time period is between similar reference points on two adjacent workpieces.

As used herein, one cycle is defined as a movement of the piston 16 from any starting position to one end of the cylinder, reversing direction and moving to the opposite end of the cylinder, and reversing back to the starting position.

Figure 1:
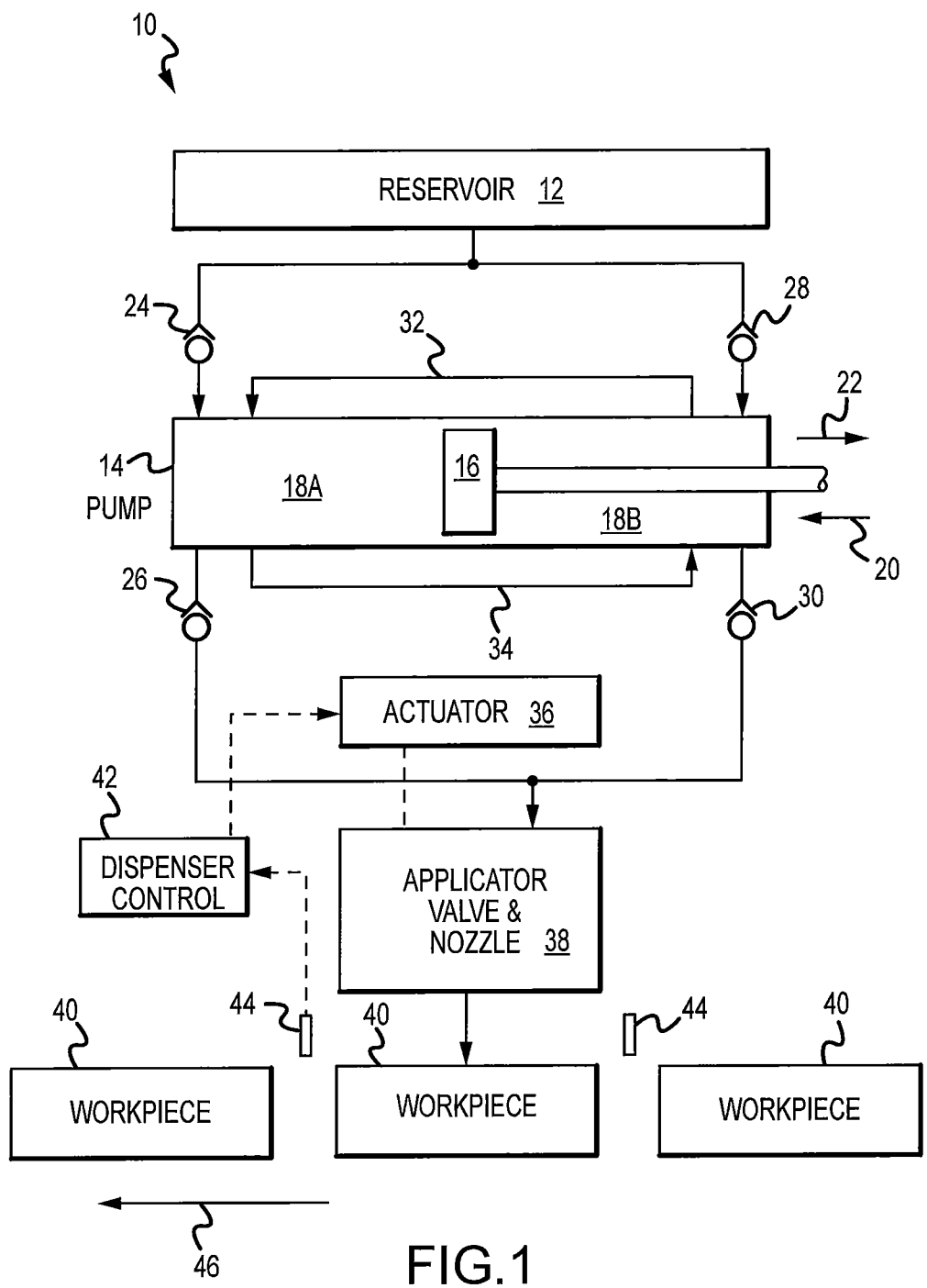
FIG. 1 is a schematic block diagram of an exemplary production adhesive dispensing system in accordance with the present invention.
Figure 2:
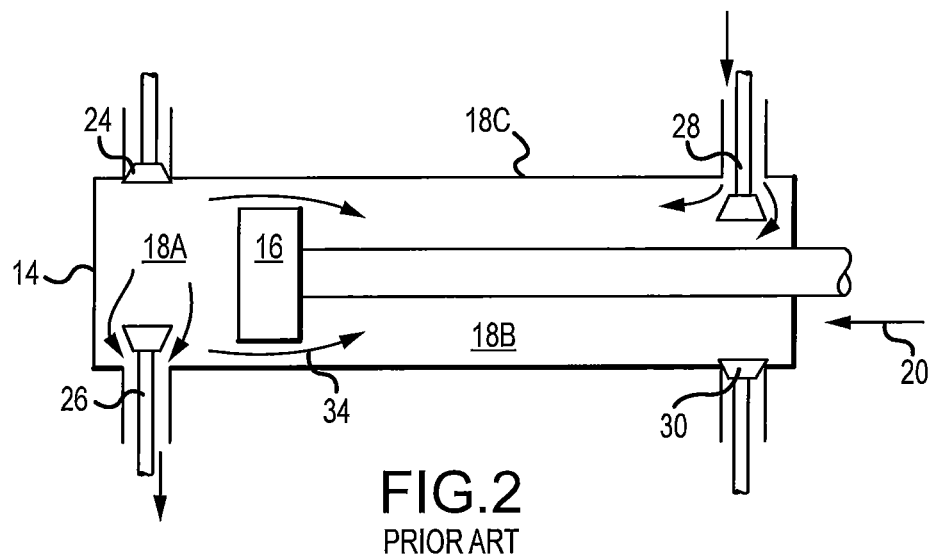
FIG. 2 is a schematic side elevational, sectional view of a pump used in the adhesive dispensing system of FIG. 1.
Figure 3:
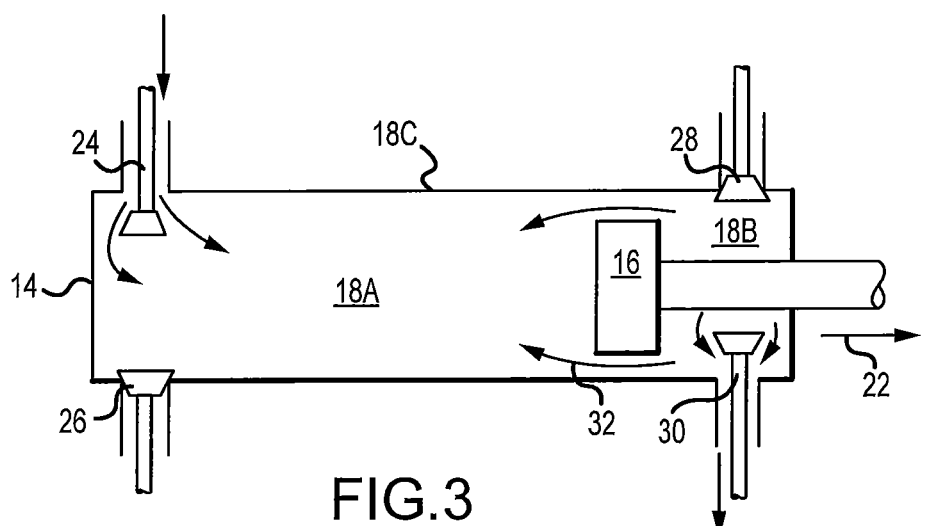
FIG. 3 is another schematic side elevational, sectional view of the pump used in the adhesive dispensing system of FIG. 1.
Figure 4:
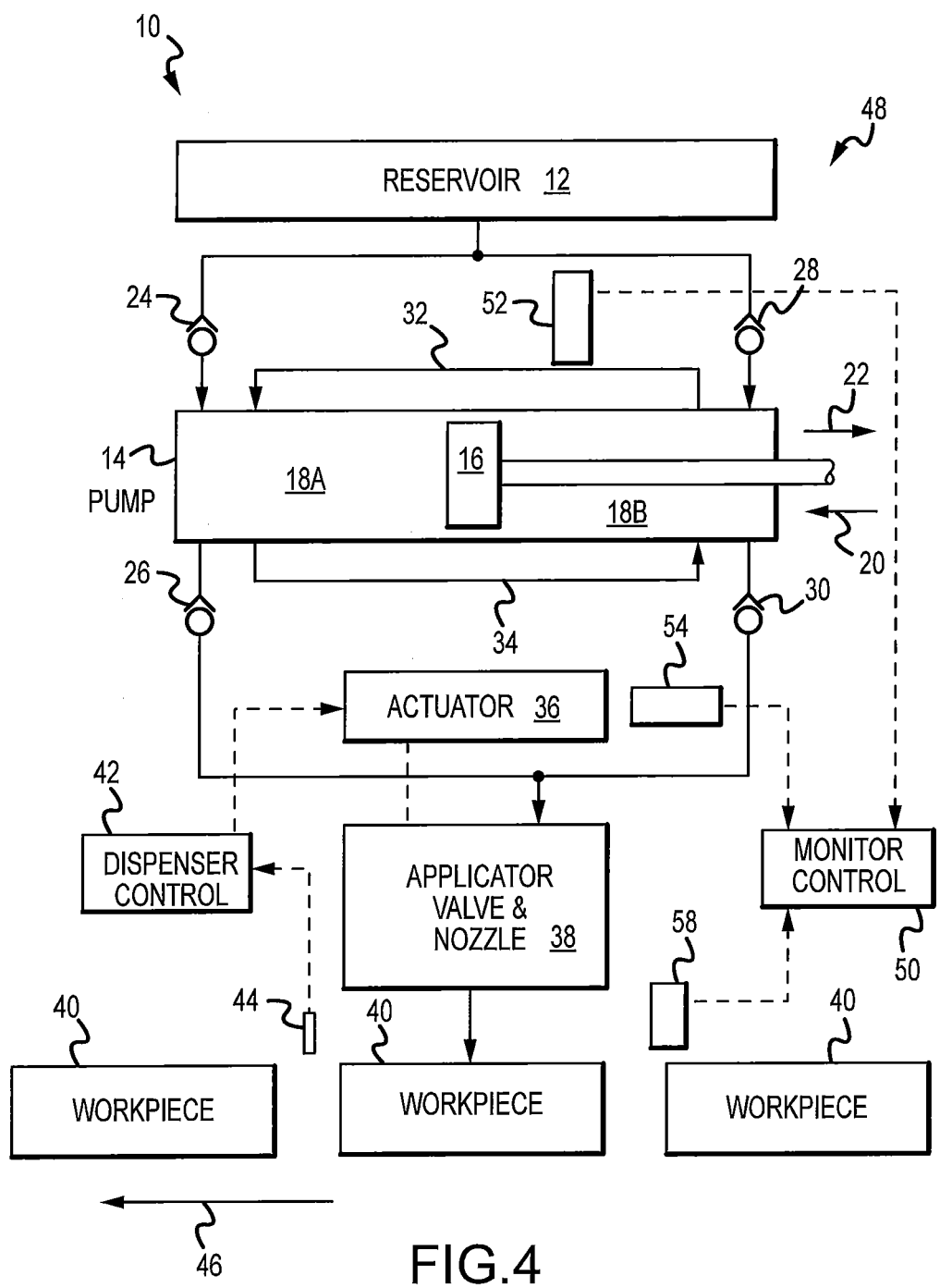
FIG. 4 is a schematic block diagram of a remote adhesive monitoring system constructed in accordance with the invention, and installed on the production adhesive dispensing system of FIG. 1.

Describing now in further detail these exemplary embodiments with reference to the Figures as described above, the remote adhesive monitoring system is shown at 48 in FIG. 4. The monitoring system 48 is connected to a production dispensing system 10. The monitoring system 48 includes a monitor control computer 50 with an associated data processing program. Also included are a pump cycle sensor 52 mounted adjacent the pump to detect movement of the piston, and thereby count pump cycles. An applicator sensor 54 is mounted adjacent the applicator actuator 36 to detect when the valve is energized, and the adhesive flow is in the ON condition. Alternatively, the actuator 36 wiring (not shown) can be connected directly to the monitor control 50. These components will be described in further detail below.

The monitoring system 48 must be calibrated for each particular dispensing system 10, as different manufacturer's dispensing systems will have differing parameters of operation. The example shown is a cardboard box filled with a granular product. It is to be understood that the monitoring system 48 can be applied to a variety of dispensing systems and workpieces, within the spirit and scope of the claims.

The first step in practicing the invention is to determine the weight of adhesive applied per workpiece 40. This is done empirically by weighing the adhesive applied by the dispensing system 10.

Figure 5:
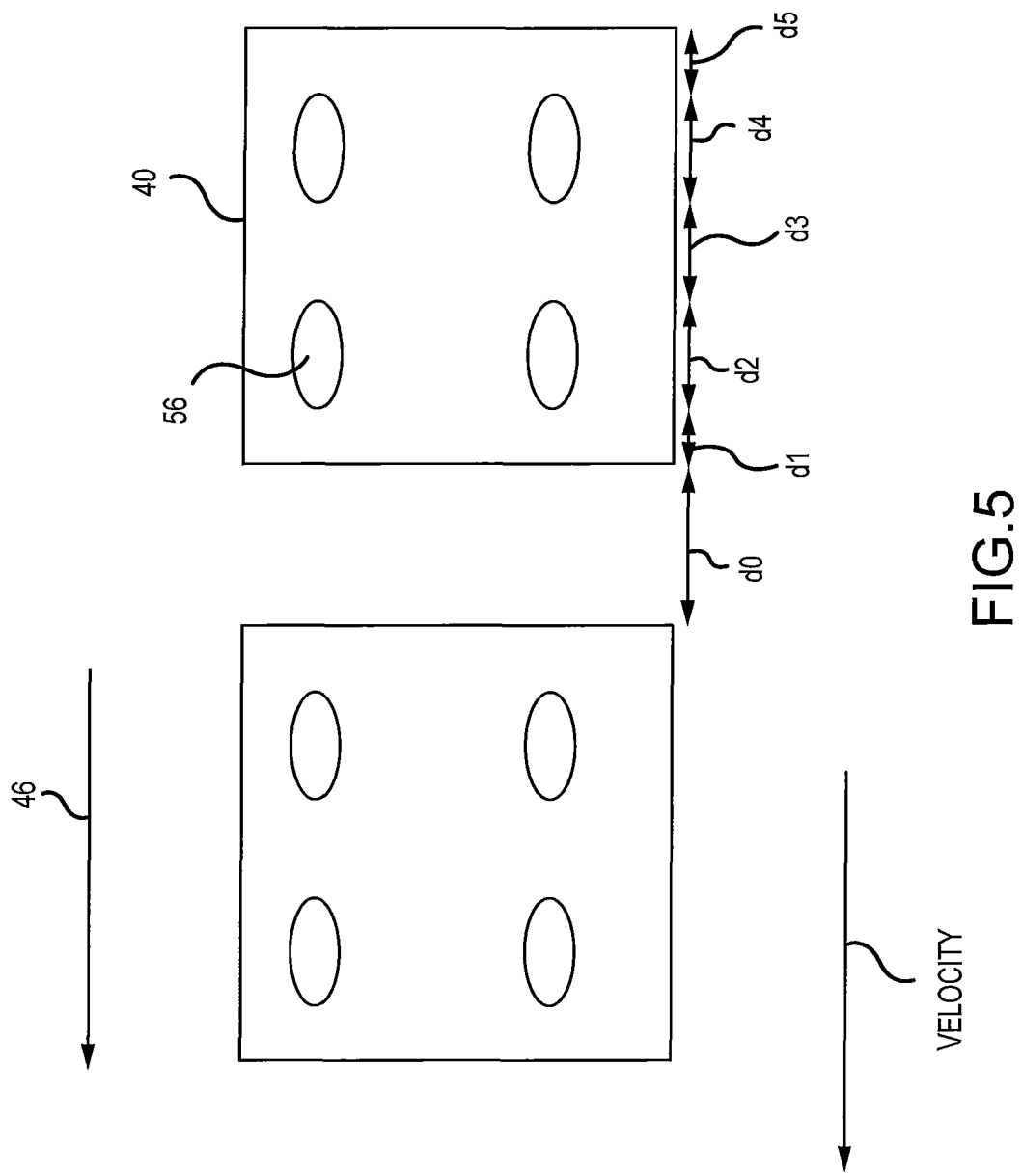
FIG. 5 is schematic top plan view of workpieces on a filling and sealing line, and showing beads of adhesive.

The next step is to determine the ON time and the TOTAL time. A first method for finding ON time is empirically, by measuring the distance between the same points on adjacent workpieces 40 and the length of the adhesive beads 56 on each workpiece. This is shown as an example in FIG. 5. Distances d2 and d4 are divided by the speed of the workpieces moving along the line to give t2 and t4. The sum is ON=t2+t4. The ON time is the time of extrusion of adhesive per workpiece. In a similar manner, TOTAL time is the sum of all line segments d0 to d5 divided by the speed of the workpieces. TOTAL=t0+t1+t2+t3+t4+t5.

Another method for finding ON time is electrically tracking the time that the applicator valve 36 is open. This can be done by connecting directly to the actuator 36 wiring. An alternative is to mount an applicator sensor 54 adjacent the actuator 36 to detect when the valve is energized. Typically, a magnetic reed switch sensor or similar device is used. A package rate sensor 58 is installed on the line and counts the workpieces per unit of time.

During a predetermined number of pump cycles, the number of workpieces processed are counted and divided by the number of cycles. The result is workpieces per cycle. ON time segments during the predetermined number of cycles are summed and divided by the workpieces per cycle. The result is ON time per each workpiece.

$$\frac{\text{ON time}}{\text{Cycle}} \div \frac{\text{workpieces}}{\text{Cycle}} = \frac{\text{ON time}}{\text{workpiece}}$$

The ON ratio is ON time divided by TOTAL time, usually expressed as a percentage. The ON ratio is equal to ON time per each workpiece times workpieces per pump cycle times pump cycles per TOTAL time.

$$\frac{\text{ON time}}{\text{workpiece}} \times \frac{\text{workpieces}}{\text{CYCLE}} \times \frac{\text{pump cycles}}{\text{Total time}} = \text{ON ratio}$$

The ON ratio will change with the packaging line speed. The number of workpieces per pump cycle must be determined for a range of ON ratios from low, approximately 1-5% to high, approximately 75-100%. A number of test points, for example, 10-20, must be taken to render a calibration curve. These are found empirically by varying the line speed at different values and measuring.

The amount of adhesive used for each ON ratio data point is workpieces per pump cycle times weight of adhesive applied per workpiece. As noted above, the number of workpieces per pump cycle will vary with the packaging line speed.

$$\frac{\text{workpieces}}{\text{CYCLE}} \times \frac{\text{weight}}{\text{workpiece}} = \frac{\text{weight}}{\text{CYCLE}}$$

Figure 6:
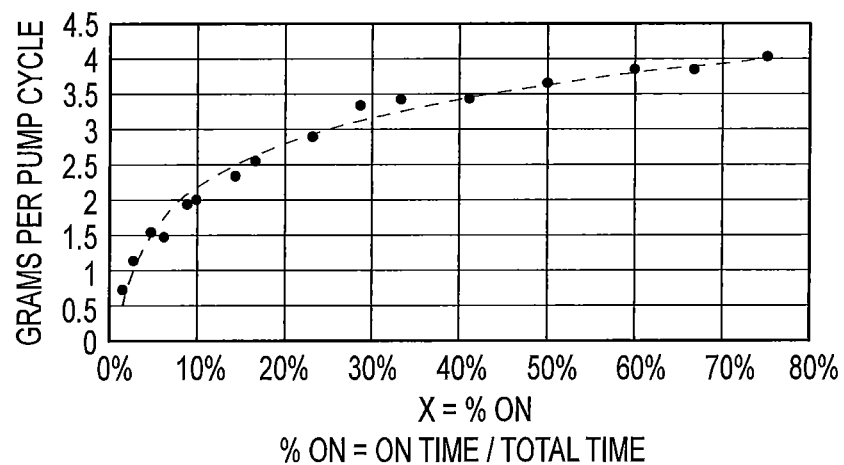
FIG. 6 is a graph of grams of adhesive per pump cycle, as a function of percent ON time, empirically derived.

Each ON ratio data point is plotted with a corresponding value of weight per pump cycle. A sample curve is shown in FIG. 6. This method compensates for the pump leakage described above. It has been found that the logarithm of ON ratio plotted against weight per pump cycle is a straight-line relationship. A linear regression of this relationship generates constants a and b, the slope and y-intercept, respectively, of the straight-line relationship.

$$y = a \times \ln(x) + b$$

Figure 7:
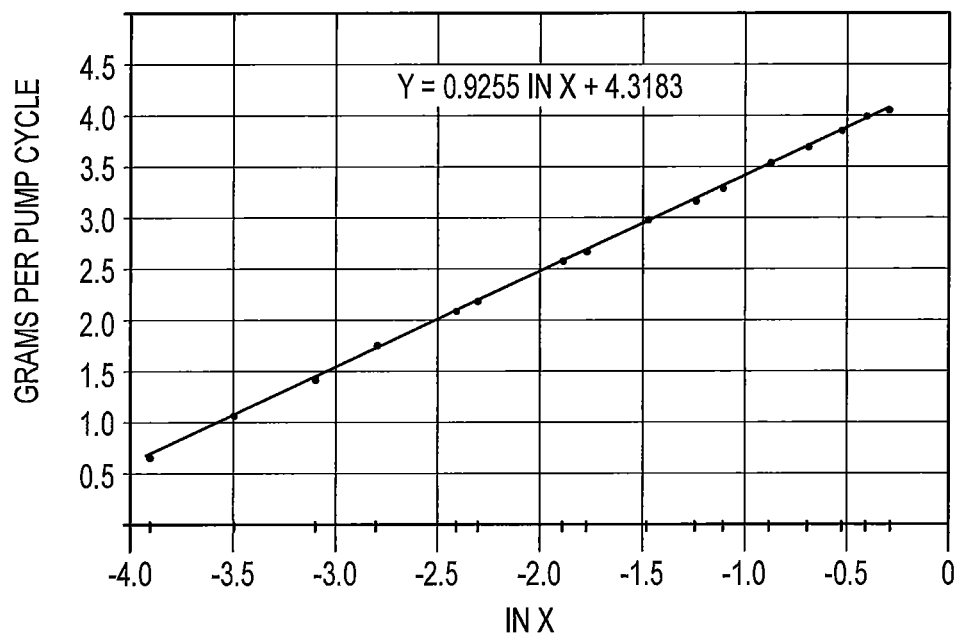
FIG. 7 is a graph of grams of adhesive per pump cycle, as a function of the logarithm of percent ON time, derived by formula.

A sample curve is shown in FIG. 7 that corresponds to the same data points in the curve of FIG. 6.

Example

The weight of adhesive per workpiece is measured to be 3 grams per workpiece. During 3 consecutive pump cycles, 10 workpieces are processed on a manufacturing line. 10 workpieces divided by 3 cycles results in 3.33 workpieces per cycle. ON time per workpiece is 0.5 seconds. Total time for the period of three consecutive pump cycles is measured to be 25 seconds. The ON ratio for this period is:

$$0.5 \text{ sec} \frac{\text{ON time}}{\text{workpiece}} \times 3.33 \frac{\text{workpiece}}{\text{cycle}} \times \frac{3}{25} \frac{\text{cycles}}{\text{seconds}} = 25\% \text{ ON ratio}$$

The weight of adhesive per cycle is:

$$3 \text{ gm} \frac{\text{weight}}{\text{workpiece}} \times 3.33 \frac{\text{workpiece}}{\text{cycle}} = 10 \text{ gm} \frac{\text{weight}}{\text{cycle}}$$

This method is repeated for workpiece rates of 5 workpieces per 3 cycles and 20 workpieces per 3 cycles. Using ON ratio as the dependent variable and weight per cycle as the independent variable, a relationship between ON ratio and weight per cycle is established via a linear regression. Constants a and b represent the slope and y-intercept, respectively, of the linear regression.

The pump cycle rate sensor 52 installed adjacent the pump 14 measures pump cycles per unit of time. Workpieces per unit of time is divided by pump cycles per unit of time to determine the number of workpieces per pump cycle.

$$\frac{\text{workpieces}}{\text{HOUR}} \div \frac{\text{pump cycles}}{\text{HOUR}} = \frac{\text{workpieces}}{\text{CYCLE}}$$

In addition to input from the pump cycle rate sensor, the applicator sensing means, and the workpiece sensor, the calibration constants a and b are input into the data processing program of the monitor control for use in continuous and automatic calculations of weight per cycle.

Example: Line speed is adjusted to deliver 3,024 boxes per hour. Sensors count 1,260 cycles per hour.

$$3,024 \frac{\text{workpieces}}{\text{HOUR}} \div 1,260 \frac{\text{pump cycles}}{\text{HOUR}} = 2.4 \frac{\text{workpieces}}{\text{CYCLE}}$$

ON time segments per unit of time and workpieces per unit of time are measured by sensors.

$$1,512 \text{ sec} \frac{\text{ON time}}{\text{HOUR}} \div 3,024 \frac{\text{workpieces}}{\text{HOUR}} = 0.5 \text{ sec} \frac{\text{ON time}}{\text{workpiece}}$$

Weight of adhesive per workpiece is determined empirically to be 1.46 gm. Grams of adhesive per pump cycle is calculated:

$$2.4 \frac{\text{workpieces}}{\text{CYCLE}} \times 1.46 \text{ gm} \frac{\text{weight}}{\text{workpiece}} = 3.5 \text{ gm} \frac{\text{weight}}{\text{CYCLE}}$$

The pump cycle sensor 52 measures 1,260 cycles per hour. This equals one cycle per 2.857 seconds, or 0.35 cycles per second. The ON ratio' is calculated:

$$0.5 \text{ sec} \frac{\text{ON time}}{\text{workpiece}} \times 2.4 \frac{\text{workpieces}}{\text{CYCLE}} \times 0.35 \frac{\text{pump cycles}}{\text{sec}} = 0.42 \text{ ON ratio}$$

This data point of 3.5 gm per cycle at 42% ON ratio is plotted in FIG. 6. Other data points are shown to give a calibration curve. Once derived, this calibration curve is used to determine grams of adhesive per pump cycle at any ON ratio. The leakage past the piston is compensated for, resulting in an accurate weight accounting.

Now, using the logarithm of ON ratio, grams of adhesive per pump cycle can be found using the relation:

$$y = 0.9255 \times \ln(0.42) + 4.3183 = 3.5 \text{ gm}$$

In this example, if the pump cycles 600 times, the adhesive weight dispensed is 600×3.5 gm=2,100 gm.

This simple relation can be programmed into the monitor control computer 50 for continuous monitoring of adhesive dispensed on the line. The result can be viewed at the line or remotely via telemetry on the internet.

The type of the adhesives depends on the end-use applications and desired performance properties. The remote adhesive monitoring system can be used with any adhesives applied to any workpiece. Typical adhesive useful for dispensing to the workpiece includes thermoplastic adhesives; however, thermoset adhesives are contemplated. Hot melt adhesive is applied in a molten state and solidifies as it cools to room temperature.

The hot melt adhesives may be made from any number of base polymers. As used herein, polymers include ethylene-vinyl acetate; ethylene-acrylate; polyolefins; polyamides; polyesters; thermoplastic polyurethanes; reactive polyurethanes; styrene block copolymer; polycaprolactone; polycarbonates; fluoropolymers; silicone rubbers, thermoplastic elastomers; and polypyrrole. The polymer content in the hot melt adhesive ranges from about 10 to about 70 wt %, preferably from about 20 to about 60 wt %.

In a preferred embodiment, the hot melt adhesives include polymers selected from ethylene-vinyl acetate copolymers; ethylene-acrylate copolymers and polyolefins.

The ethylene-vinyl acetate copolymers preferably have a vinyl acetate content less than 40% and a melt index ranges of from about 5 to about 2,500 g/10 min as measured in accordance with ASTM.

The ethylene-acrylate copolymers have an acrylate content less than 40% and a melt index ranges of from about 5 to about 2500 g/10 min as measured in accordance with ASTM D1238. Examples of ethylene-acrylate copolymers include ethylene n-butyl acrylate, ethylene-acrylic acid and ethylene-ethyl acetate.

The polyolefin polymers include C2-C20 homopolymers, copolymers and terpolymers. Depending on the monomer and comonomer selection, and the catalyst in the polymerization, the polyolefin may be substantially amorphous, semicrystalline or crystalline. Depending on the desired crystallinity and molecular weight, various combinations of the monomers may be selected as the polymer for the hot melt adhesives. Both metallocene catalyzed polyolefins with narrow molecular weight distributions and non-metallocene catalyzed (Zigler-Natta catalyzed) polyolefins may be chosen as the base polymer for the adhesive. Examples of preferred polyolefins include ethylene-alpha olefin, e.g., C2 with C3, C4, C5, C6, C7, C8, C9, C10, C11 and/or C12 with a melt index greater than about 5 to about 2,500 g/10 min at 190° C. measured in accordance with ASTM D1238, with the overall crystallinity ranging from about 10% to about 25% of the polymer. Propylene copolymers, e.g., C3 with C2, C4, C5, C6, C7, C8, C9, C10, C11 and/or C12 with a melt index greater than about 5 to about 2,500 g/10 min at 190° C. measured in accordance with ASTM D1238 and overall crystallinity ranging from about 10% to about 25% of the polymer is another preferred olefin.

Tackifier is chosen based on the polymer of hot melt adhesives. While miscibility between the tackifier and the polymer is a primary factor in choosing a particular tackifier for a hot melt adhesive composition, less miscible tackifiers may be used in the adhesives. The tackifier component may typically be present from about 20 to about 80 wt %, preferably from about 30 to about 60 wt %, based on the total weight of the adhesive.

The hot melt adhesives may optionally comprise a wax, plasticizer, oil, stabilizer, and additive.

When used, the wax component will typically be present in amounts of up to about 40 wt %, based on the hot melt adhesive. Formulation comprising a wax component will more typically comprise up to about 40 wt %.

The adhesives may optionally contain a plasticizer, including oil. Suitable plasticizers include polybutenes, polyisobutylene, phthalates, benzoates, adipic esters and the like. Particularly preferred plasticizers include polybutenes and polyisobutylenes, phthalates such as di-iso-undecyl phthalate (DIUP), di-iso-nonylphthalate (DINP), dioctyl-phthalates (DOP), mineral oil, aliphatic oils, olefin oligomers and low molecular weight polymers, vegetable oil, animal oils, paraffinic oil, naphthenic oil, aromatic oil, long chain partial ether ester, alkyl monoesters, epoxidized oils, diallyl diesters, aromatic diesters, alkyl ether monoester and mixtures thereof. In one embodiment, the plasticizer has a number average molecular weight greater than 1000 g/mol. In another embodiment, the plasticizer is typically present up to about 35 wt %, more preferably up to 30 wt %, based on the total weight of the adhesive.

The hot melt adhesives may desirably also contain at least one stabilizer and/or at least one antioxidant. These compounds are added to protect the adhesive from degradation caused by reaction with oxygen induced by such things as heat, light, or residual catalyst from the raw materials such as the tackifying resin.

Depending on the contemplated end uses of the adhesives, other additives such as pigments, dyestuffs and fillers conventionally added to the adhesives may be incorporated in minor amounts, i.e., up to about 10% by weight.

The adhesives may be prepared using techniques known in the art. Typically, the adhesive compositions are prepared by blending the components in the melt at a temperature of about 100° C. to 200° C. until a homogeneous blend is obtained. Various methods of blending are known and any method that produces a homogeneous blend is satisfactory.

Depending on the adhesive composition, the adhesive can be applied at different temperatures, ranging from about 40° C. to about 300° C., preferably from about 70° C. to about 200° C., more preferably from about 100° C. to about 165° C. In one embodiment, the adhesive is applied at temperatures below at about 150° C.

It will be appreciated that variants of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

What is claimed is:

1. A method for remotely monitoring an adhesive applied to workpieces moving at a predetermined speed in a process direction on a production line having a reservoir, a pump, and an applicator, the method comprising:
   weighing the adhesive applied to the workpieces;
   providing an applicator sensor for sensing the adhesive applied to the workpieces;
   providing a workpiece sensor for sensing the workpieces moving;
   providing a monitor control and an associated data processing program;
   calculating an ON time for applying the adhesive per each workpiece at said predetermined speed with the monitor control using input from the applicator sensor and the workpiece sensor;
   providing a pump cycle sensor for sensing pump cycles;
   calculating workpieces per pump cycle with the monitor control using input from the workpiece sensor and the pump cycle sensor;
   calculating an ON time to TOTAL time ratio, defined as ON ratio, per each workpiece with the monitor control;
   calculating an amount of adhesive used for said ON ratio with the monitor control;
   varying the line speed over a range of different speed values;
   measuring workpieces per unit of time at each speed value over the range of different speed values with the workpiece sensor;
   calculating workpieces per pump cycle;
   calculating an ON time for applying the adhesive per each workpiece at each speed value over the range of different speed values;
   calculating an ON ratio per each workpiece at each speed value over the range of different speed values;
   calculating weight of adhesive applied per pump cycle at each ON ratio corresponding to each respective speed value;
   plotting weight of adhesive applied per pump cycle at each ON ratio, thereby calibrating the system for each ON ratio; and
   monitoring the weight of adhesive applied at a selected ON ratio, with the monitor control.

2. The method of claim 1, further comprising:
   plotting the logarithm of ON ratio against weight per pump cycle at each ON ratio; and
   monitoring the weight of adhesive applied at a selected logarithm of ON ratio, with the monitor control.

3. The method of claim 2, wherein plotting the logarithm of ON ratio against weight per pump cycle at each ON ratio further comprises the relation $$y = a \times \ln(x) + b;$$

wherein
   y is weight per pump cycle;
   x is ON ratio; and
   a and b are calibration constants.

4. The method of claim 2, further comprising:
   remotely monitoring the weight of adhesive applied, with the monitor control;
   remotely monitoring the number of workpieces per time unit, with the monitor control; and
   remotely monitoring over the internet via telemetry.

* * * * *

UNITED STATES PATENT AND TRADEMARK OFFICE
CERTIFICATE OF CORRECTION

PATENT NO. : 10,421,097 B2
APPLICATION NO. : 15/911365
DATED : September 24, 2019
INVENTOR(S) : David Duckwort et al.

Page 1 of 1

It is certified that error appears in the above-identified patent and that said Letters Patent is hereby corrected as shown below:

In the Drawings

Sheet 3 of 5: Change "FIG.4 PRIOR ART" to --FIG.4--.

Signed and Sealed this
Twenty-first Day of April, 2020

Andrei Iancu
*Director of the United States Patent and Trademark Office*